United States Patent
Tada

(10) Patent No.: US 12,148,554 B2
(45) Date of Patent: Nov. 19, 2024

(54) BONDED MAGNET AND METHOD OF PREPARING THE SAME

(71) Applicant: NICHIA CORPORATION, Anan (JP)

(72) Inventor: Shuichi Tada, Anan (JP)

(73) Assignee: NICHIA CORPORATION, Anan (JP)

( * ) Notice: Subject to any disclaimer, the term of this patent is extended or adjusted under 35 U.S.C. 154(b) by 725 days.

(21) Appl. No.: 16/586,889

(22) Filed: Sep. 27, 2019

(65) Prior Publication Data

US 2020/0105445 A1 Apr. 2, 2020

(30) Foreign Application Priority Data

Sep. 28, 2018 (JP) ................................. 2018-184251
Sep. 9, 2019 (JP) ................................. 2019-163733

(51) Int. Cl.
*H01F 1/055* (2006.01)
*C22C 38/00* (2006.01)
*H01F 1/059* (2006.01)
*H01F 41/02* (2006.01)
*H02K 1/02* (2006.01)

(52) U.S. Cl.
CPC ......... *H01F 1/0551* (2013.01); *C22C 38/005* (2013.01); *H01F 1/059* (2013.01); *H01F 41/0253* (2013.01); *C22C 2200/02* (2013.01); *C22C 2202/02* (2013.01); *H02K 1/02* (2013.01); *Y10T 428/32* (2015.01)

(58) Field of Classification Search
CPC . C22C 2202/02; C22C 38/005; H01F 1/0551; H01F 1/0558; H01F 1/059; H01F 41/0253; H02K 1/02
See application file for complete search history.

(56) References Cited

FOREIGN PATENT DOCUMENTS

| JP | H09-12869 A | 1/1997 |
|---|---|---|
| JP | 2005-116789 A | 4/2005 |
| JP | 2007335676 A | * 12/2007 |
| JP | 2017-043804 A | 3/2017 |

* cited by examiner

*Primary Examiner* — Holly Rickman
*Assistant Examiner* — Lisa Chau
(74) *Attorney, Agent, or Firm* — Hunton Andrews Kurth LLP

(57) ABSTRACT

The present invention provides a bonded magnet having good heat resistance. The present invention relates to a bonded magnet containing a SmFeN magnetic powder, nylon 12, and a hexafluoroisopropanol-unextractable component. The present invention also relates to a method of preparing a bonded magnet, including: bringing a raw material bonded magnet containing a SmFeN magnetic powder and nylon 12 into contact with an amorphizing agent; and heat-treating the raw material bonded magnet in contact with the amorphizing agent.

3 Claims, 1 Drawing Sheet

BONDED MAGNET AND METHOD OF PREPARING THE SAME

CROSS-REFERENCE TO RELATED PATENT APPLICATION

This application claims priority to Japanese Patent Application No. 2018-184251 filed on Sep. 28, 2018 and Japanese Patent Application No. 2019-163733 filed on Sep. 9, 2019. The disclosures of Japanese Patent Application No. 2018-184251 and Japanese Patent Application No. 2019-163733 are hereby incorporated by reference in their entireties.

BACKGROUND

Technical Field

The present invention relates to a bonded magnet and a method of preparing the same.

Description of Related Art

JP 2005-116789 A discloses a bonded magnet including a nylon film formed on the surface of magnetic particles. Moreover, JP H09-12869 A discloses a bonded magnet containing crystalline nylon 6 resin and an amorphous nylon resin.

While the heat resistance of these bonded magnets is described, it is desirable to further improve heat resistance.

SUMMARY

The present invention aims to provide a bonded magnet having good heat resistance.

With an aim to improve the heat resistance of bonded magnets, the present inventor made extensive studies. As a result, it has been found that when a bonded magnet contains a nylon 12-derived component that is not extractable with hexafluoroisopropanol, the bonded magnet is inhibited from oxidative degradation and has improved heat resistance. This finding has led to the completion of the present invention.

Specifically, the present invention relates to a bonded magnet, containing: a SmFeN magnetic powder; nylon 12; and a hexafluoroisopropanol-unextractable component. The present invention also relates to a method of preparing a bonded magnet, including: bringing a raw material bonded magnet containing a SmFeN magnetic powder and nylon 12 into contact with an amorphizing agent; and heat-treating the raw material bonded magnet in contact with the amorphizing agent.

The bonded magnet of the present invention contains a hexafluoroisopropanol-unextractable component to greatly improve heat resistance.

BRIEF DESCRIPTION OF DRAWINGS

FIG. 1 is a photograph of a specimen prepared by subjecting the bonded magnet obtained in Example 1 to Soxhlet extraction with hexafluoroisopropanol.

DETAILED DESCRIPTION

Embodiments of the present invention are described in detail below. The following embodiments, however, are intended as examples to embody the technical idea of the present invention and are not intended to limit the scope of the present invention to the following embodiments. As used herein, the term "step" encompasses not only an independent step but also a step that may not be clearly distinguished from other steps, as long as a desired object of the step is achieved.

A bonded magnet according to the present embodiment (hereinafter, "bonded magnet (A)") may contain a SmFeN magnetic powder, nylon 12, and a hexafluoroisopropanol-unextractable component.

The SmFeN magnetic powder contained in the bonded magnet (A) may be a nitride having a $Th_2Zn_{17}$-type crystal structure and containing the rare earth metal Sm, iron (Fe), and nitrogen (N) as represented by the formula: $Sm_x Fe_{100-x-y} N_y$, wherein the value "x" indicating the atomic percent (%) of the rare earth metal Sm is in the range of 8.1 to 10 (at %); the value "y" indicating the atomic percent (%) of N is in the range of 13.5 to 13.9 (at %); and the balance is mainly Fe. The SmFeN magnetic powder is more typically represented by $Sm_2Fe_{17}N_3$. SmFeN magnetic powders have stronger magnetic force than that of ferrite magnetic powders, and even relatively small quantities of SmFeN can provide high magnetic force. Moreover, SmFeN magnetic powders have a smaller particle size than that of other rare earth magnetic powders such as NdFeB and SmCo and thus are suitable as filler for the matrix resin. Their another feature is that they are less likely to rust. The bonded magnet (A) may further contain a rare earth magnetic powder such as NdFeB or SmCo or a ferrite magnetic powder.

The average particle size of the magnetic powders is not particularly limited. For the SmFeN magnetic powder, the lower limit of the average particle size is preferably 0.1 µm or greater, more preferably 0.5 µm or greater, while the upper limit of the average particle size is preferably 10 µm or less, more preferably 5 µm or less. With an average particle size less than 0.1 µm, the magnetic particles tend to be susceptible to oxidation, resulting in poor magnetic properties. With an average particle size greater than 10 µm, a multidomain state tends to be favored, resulting in poor magnetic properties. Herein, the average particle size is defined as the particle size corresponding to the 50th percentile by volume from the smallest particle size in a particle size distribution.

As for the amount of nylon 12 in the bonded magnet (A) with respect to 100 parts by mass of the magnetic powder, the lower limit is preferably 3 parts by mass or greater, more preferably 5 parts by mass or greater, while the upper limit is preferably 15 parts by mass or less, more preferably 10 parts by mass or less. With an amount less than 3 parts by mass, mechanical properties may be greatly degraded due to the small proportion of the resin layer. With an amount greater than 15 parts by mass, a strong magnet may not be produced because of the reduced proportion of the magnetic material. The bonded magnet (A) may also contain an additional resin to an extent that does not affect the heat resistance of the magnet. Examples of such additional resins include polyphenylene sulfide (PPS) and polypropylene (PP) resins.

The hexafluoroisopropanol-unextractable component contained in the bonded magnet (A) is defined as follows. When the bonded magnet (A) is subjected to Soxhlet extraction with hexafluoroisopropanol, nylon 12 is extracted by being dissolved in hexafluoroisopropanol, and the residue from the extraction contains a magnetic powder component and a hexafluoroisopropanol-unextractable component. In this embodiment, the hexafluoroisopropanol-unextractable component refers to a component obtained by removing the magnetic powder component from the residue from 24-hour Soxhlet extraction of the bonded magnet (A). The hexafluoroisopropanol-unextractable component is presumed to be a crosslinked product of nylon 12 in view of its solubility in hexafluoroisopropanol.

The amount of the hexafluoroisopropanol-unextractable component in the bonded magnet (A) is preferably greater than 0.1% by mass and 5% by mass or less, more preferably 0.15% by mass or greater and 1% by mass or less. With an amount of 0.1% by mass or less, the resulting magnet is less likely to have high mechanical heat resistance due to the low crosslink density of nylon 12 on the magnet surface. With an amount greater than 5% by mass, the bonded magnet (A) can be easily broken by thermal shock due to the reduced elasticity resulting from the smaller proportion of nylon 12 in the bonded magnet (A). The amount of the hexafluoroisopropanol-unextractable component can be calculated by subtracting the amount of the magnetic powder component from the mass of the extraction residue to calculate the mass of the hexafluoroisopropanol-unextractable component, and dividing the mass of the hexafluoroisopropanol-unextractable component by the mass of the bonded magnet measured before the Soxhlet extraction. The amount of the magnetic powder component can be calculated from the amount of the magnetic powder-derived metal component determined by ICP-AES analysis of a fully dissolved solution of the extraction residue.

Preferably, the hexafluoroisopropanol-unextractable component contained in the bonded magnet (A) is at least partially present in the surface layer of the bonded magnet (A). From the standpoint of heat resistance of the bonded magnet, the hexafluoroisopropanol-unextractable component is more preferably present in a larger amount in the surface layer than in the central portion of the bonded magnet (A). The thickness of the surface layer is preferably 10 μm or greater and 1 mm or less in the depth direction from the surface, for example, in view of heat resistance.

The bonded magnet (A) may contain components generally incorporated into bonded magnets, such as antioxidants, heavy metal deactivators, lubricants, and plasticizers.

A method of preparing a bonded magnet according to the present embodiment includes: bringing a raw material bonded magnet containing a SmFeN magnetic powder and nylon 12 (hereinafter, "bonded magnet (B)") into contact with an amorphizing agent; and heat-treating the raw material bonded magnet in contact with the amorphizing agent.

It is considered that when a bonded magnet (B) containing a SmFeN magnetic powder and nylon 12 is brought into contact with an amorphizing agent and then heat-treated, the SmFeN magnetic powder acts as a catalyst to form a crosslinked product of nylon 12 (hexafluoroisopropanol-unextractable component) which allows the resulting bonded magnet to have improved heat resistance. The amorphizing agent contains a component capable of dissolving and amorphizing crystalline nylon 12.

The SmFeN magnetic powder in the bonded magnet (B) is as described above, and a description thereof is thus omitted, but it can be produced as described in JP 3698538 B, for example.

The bonded magnet (B) may further contain a rare earth magnetic powder such as NdFeB or SmCo or a ferrite magnetic powder. The NdFeB magnetic powder may be produced by, for example, a HDDR method as described in JP 3565513 B. The thus produced NdFeB magnetic powder may suitably have an average particle size of 40 to 200 μm and a maximum energy product of 34 to 42 MGOe (270 to 335 kJ/m$^3$). The SmCo magnetic powder may be produced as described in JP 3505261 B, for example. The thus produced magnetic powder may have an average particle size of 10 to 30 μM.

As for the amount of nylon 12 in the bonded magnet (B) with respect to 100 parts by mass of the magnetic powder, the lower limit is preferably 3 parts by mass or greater, more preferably 5 parts by mass or greater, while the upper limit is preferably 15 parts by mass or less, more preferably 10 parts by mass or less. With the amount of nylon 12 being less than 3 parts by mass, mechanical properties may be greatly degraded due to the small proportion of the resin layer. With an amount greater than 15 parts by mass, a strong magnet may not be produced because of the reduced proportion of the magnetic material. The bonded magnet (B) may also contain an additional resin to an extent that does not affect the heat resistance of the magnet. Examples of such additional resins include PPS and PP resins.

The bonded magnet (B) may contain components generally incorporated into bonded magnets, such as antioxidants, heavy metal deactivators, lubricants, and plasticizers.

The bonded magnet (B) may be produced by melt-kneading the magnetic powder and nylon 12 to prepare a compound and molding the compound. Any melt-kneading machine may be used to prepare the compound. Examples include single screw kneading machines, twin screw kneading machines, mixing rolls, kneaders, Banbury mixers, intermeshing twin screw extruders, and non-intermeshing twin screw extruders. When nylon 12 is used, the melt-kneading temperature may be set to 180° C. or higher and 250° C. or lower. The prepared compound may be molded by any method, such as by injection molding, compression molding, extrusion molding, or rolling molding. When a SmFeN magnetic powder is used, the bonded magnet composition is preferably subjected to mechanical orientation or magnetic field orientation to align the magnetic particles in the composition.

The amorphizing agent may contain a component (A) capable of dissolving and amorphizing crystalline nylon 12 and an organic solvent (B).

In the amorphizing agent, the amount of the component (A) for dissolving and amorphizing nylon 12 may be 10 to 30% by mass, and the amount of the organic solvent (B) may be 70 to 90% by mass. Examples of the amorphizing agent include those described in JP 2003-89131 A.

The component (A) capable of dissolving and amorphizing crystalline nylon 12 refers to a component that partially dissolves and amorphizes the crystalline region of nylon 12 and enters between the polymer chains, thus increasing the space between the polymer chains. Examples include dihydric or higher polyhydric phenols, fluorine-containing fluoroalcohols, and benzenesulfonamides having a —SO$_2$NH$_2$ group that forms a strong hydrogen bond with nylon resin.

The dihydric or higher polyhydric phenols refer to benzene compounds having two or more hydroxyl groups in the molecule. Examples include dihydric phenols such as 1,3-dihydroxybenzene, 1,2-dihydroxybenzene, 1,4-dihydroxybenzene, 1-chloro-2,4-dihydroxybenzene, 2-chloro-1,3-dihydroxybenzene, 1,3-dihydroxy-4-methylbenzene, 1,3-dihydroxy-2-methylbenzene, 3,5-dihydroxybenzoic acid, and 2,4-dihydroxybenzoic acid; and trihydric phenols such as 1,2,3-trihydroxybenzene, 1,2,4-trihydroxybenzene, 1,3,5-trihydroxybenzene, 3,4,5-trihydroxybenzoic acid, and 2,4,6-trihydroxybenzoic acid. Among these, dihydric phenols having good solubility in solvents are preferred. For example, 1,3-dihydroxybenzene is more preferred in view of availability.

Fluorine-containing fluoroalcohols are also categorized, for example, under the name "fluorine-containing alcohols" or "fluorinated alcohols". p Examples include 1,2,3-trifluoroehtyl alcohol, 1,1,1,3,3,3-hexafluoro-2-propanol (HFIP), 2,2,3,3-tetrafluoro-l-propanol, and 2-p erfluoroalkylethyl alcohol. Among these, 1,1,1,3,3,3-hexafluoro-2-propanol (HFIP) is preferred because it has a high ability to dissolve nylon 12 resin.

The benzenesulfonamides having a —SO$_2$NH$_2$ group that forms a strong hydrogen bond with nylon resin refer to compounds having a sulfonamide group (—SO$_2$NH$_2$) in its structure, as represented by R—SO$_2$NH$_2$ (primary sulfonamide), R—SO$_2$NHR' (secondary sulfonamide), or R—SO$_2$NR'R" (tertiary sulfonamide). In each of the above three formulae, R is an aromatic hydrocarbon group that may be substituted by a halogen (e.g., Cl) or an NH$_2$, sulfonamide, or other groups, and R' and R" are each a hydrocarbon group represented by C$_n$H$_{2n+1}$ (n=1-4). Examples include benzenesulfonamide, 1,2-benzenedisulfonamide, 2-chlorobenzenesulfonamide, 4-chlorobenzenesulfonamide, 2-methylbenzenesulfonamide, 4-methylbenzenesulfonamide, 3-aminobenzenesulfonamide, 4-aminobenzenesulfonamide, and 4-(2-aminoethyl)benzenesulfonamide. Among these, primary sulfonamides (R—SO$_2$NH$_2$), which can easily form a strong hydrogen-bond associate with the amide group of nylon resin, are preferred, with benzenesulfonamide (R is a benzene ring) being more preferred in view of solvent solubility and thermal stability.

The organic solvent (B) is preferably an alcohol. Examples include methyl alcohol, ethyl alcohol, propyl alcohol, isopropyl alcohol, butyl alcohol, pentyl alcohol, tert-butyl alcohol, and hexyl alcohol.

The amorphizing agent may further contain a component (C) capable of maintaining the increased space between the polymer chains due to the component (A). Examples of the component (C) include those having a solubility parameter (SP value) in the range of 9 to 13 and having a functional group capable of forming a hydrogen bond with the amide group of nylon 12 and a bulky molecular structure. Without being bound by theory, it is considered that the component (C) may enter the space between the polymer chains increased by the component (A) and may form a hydrogen bond with each polymer chain, so that the component (C) may serve as a pillar to maintain the increased space between the polymer chains. Examples of the component (C) include nylons other than nylon 12 and compounds having a fluorene skeleton. The amount of the component (C) in the amorphizing agent may be 10 to 20% by mass.

Examples of the nylons other than nylon 12 include nylon 6 (SP value: 11.6), nylon 6,6 (SP value: 11.6), nylon 11 (SP value: 10.1), nylon 6,12 (SP value: 11.6), nylon 6,10 (SP value: 10.8), nylon 6,66 (SP value: 11.6), and nylon MXD6 (SP value: 11.6). These may be used alone or as a mixture of two or more types.

Examples of the compounds having a fluorene skeleton include low molecular weight fluorene compounds such as bisaminophenylenefluorene (SP value: 12.7), bistoluidinefluorene (SP value: 12.3), bisphenoxyethanolfluorene (SP value: 12.3), and 2-aminofluorene (SP value: 12.7); and oligomers and polymers having a fluorene structure (e.g., the fluorene-based oligomer "OGSOL MF-11" available from Osaka Gas Chemicals Co., Ltd.). These may be used alone or as a mixture of two or more types.

The method of bringing the bonded magnet (B) into contact with the amorphizing agent is not particularly limited as long as they can be brought into contact with each other. Examples include a method that immerses the bonded magnet (B) in the amorphizing agent and a method that applies or sprays the amorphizing agent onto the bonded magnet (B).

Next, the bonded magnet (B) in contact with the amorphizing agent is heat-treated. The heat treatment causes the nylon 12 amorphized by the contact with the amorphizing agent to crosslink to become a hexafluoroisopropanol-unextractable component. The SmFeN magnetic powder contained in the bonded magnet (B) may act as a catalyst to promote the crosslinking reaction, which may permit a great reduction in heat treatment time.

The lower limit of the heat treatment temperature is preferably 150° C. or higher, more preferably 160° C. or higher, while the upper limit is preferably lower than 178° C. At a temperature lower than 150° C., it may take a long time to cause a crosslinking reaction, thereby resulting in an increased treatment cost. At a temperature of 178° C. or higher, a great deformation may occur, e.g., due to the melting of nylon 12. Thus, both cases are not preferred.

The heat treatment time is not particularly limited, but the upper limit thereof is preferably 100 hours or less, more preferably 10 hours or less. A heat treatment time of more than 100 hours is not preferred because the treatment cost increases with an increase in treatment time.

EXAMPLES

Examples are described below. It should be noted that "%" is by mass unless otherwise specified.

Example 1

Preparation of Bonded Magnet (B) Composition

A samarium-iron-nitrogen magnetic powder (average particle size: 3 μm) (92% by mass) was mixed with a nylon 12 resin powder (7.7% by mass) and a phenolic antioxidant powder (0.3% by mass) by a mixer, and the resulting powder mixture was fed into a twin-screw kneading machine and kneaded at 210° C. to obtain a kneaded mixture. The kneaded mixture was cooled and then cut to obtain a bonded magnet composition.

Molding

The bonded magnet composition was melted in a cylinder at 250° C. and injection-molded in an orientation field of 9 kOe in a mold whose temperature was adjusted to 90° C. Thus, a bonded magnet (B) was produced.

Amorphization and Heat Treatment

The amorphizing agent "NP-221" (a solution of a dihydroxybenzene derivative mixture in alcohol available from Katazen Co., Ltd.) was applied to the entire surface of the bonded magnet (B). Subsequently, the alcohol solvent was volatilized by natural drying, and the bonded magnet (B) was heat-treated by exposure to air for 1 hour in an oven whose temperature was adjusted to 150° C. Thus, a bonded magnet (A) was prepared. Table 1 shows the conditions of heat treatment time of the examples.

Examples 2 to 4

In each example, a bonded magnet (A) was prepared by the method described in Example 1, except that the heat treatment time was changed. Table 1 shows the conditions of heat treatment time of these examples.

Example 5

A bonded magnet was prepared by the method described in Example 2, except that the samarium-iron-nitrogen magnetic powder was replaced by a powder mixture containing the samarium-iron-nitrogen powder and a neodymium-iron-boron powder having an average particle size of 200 μm at a mass ratio of 5:95.

Example 6

A bonded magnet was prepared by the method described in Example 2, except that the samarium-iron-nitrogen magnetic powder was replaced by a powder mixture containing the samarium-iron-nitrogen powder and a neodymium-iron-boron powder having an average particle size of 200 μm at a mass ratio of 50:50.

Example 7

A bonded magnet was prepared by the method described in Example 2, except that the samarium-iron-nitrogen magnetic powder was replaced by a powder mixture containing the samarium-iron-nitrogen powder and an anisotropic ferrite powder having an average particle size of 1 μm at a mass ratio of 5:95.

Example 8

A bonded magnet was prepared by the method described in Example 2, except that the samarium-iron-nitrogen magnetic powder was replaced by a powder mixture containing the samarium-iron-nitrogen powder and an anisotropic ferrite powder having an average particle size of 1 μm at a mass ratio of 50:50.

Comparative Example 1

A bonded magnet was prepared by the preparation method described in Example 1, except that the treatment with the amorphizing agent and the heat treatment were not performed.

Comparative Example 2

A bonded magnet was prepared by the method described in Example 2, except that the samarium-iron-nitrogen magnetic powder was replaced by a neodymium-iron-boron powder having an average particle size of 200 μm (91.5% by mass), and a nylon 12 resin powder (8.2% by mass) was used.

Comparative Example 3

A bonded magnet was prepared by the method described in Example 2, except that the samarium-iron-nitrogen magnetic powder was replaced by an anisotropic ferrite powder having an average particle size of 1 μm (88% by mass) and a nylon 12 resin powder (11.7% by mass) was used.

Comparative Example 4

Kneading and Molding of Nylon 12 Resin

Without using a magnetic powder, a nylon 12 resin powder (99.7% by mass) was mixed with a phenolic antioxidant (0.3% by mass) by a mixer, and the resulting powder mixture was fed into a twin-screw kneading machine and kneaded at 190° C. to obtain a kneaded mixture. The kneaded mixture was cooled and then cut into an appropriate size to obtain a nylon 12 resin composition. Subsequently, the nylon 12 resin composition was fed into the hopper of an injection molding machine where it was melted in the cylinder at 200° C. and injection-molded in a mold whose temperature was adjusted to 40° C. Thus, a bonded magnet was prepared.

The bonded magnets obtained in the examples and comparative examples were evaluated as follows. Table 1 shows the evaluation results.

Evaluation of Mechanical Heat Resistance

Each bonded magnet was left overnight at room temperature in an air-conditioned room. Then, the short-term heat resistance was evaluated by measuring the heat deflection temperature (HDT) under the conditions: flatwise; test load: 1.80 MPa; heating rate: 120° C./hr.

It is demonstrated that Examples 1 to 8 exhibited higher HDT temperatures than those of Comparative Examples 1 to 4, and therefore they had improved heat resistance.

Evaluation of Long-Term Heat Resistance

Each bonded magnet was left overnight at room temperature in an air-conditioned room, and then introduced and exposed to air for 1000 hours in an oven whose temperature was adjusted to 150° C. The resulting product was left overnight at room temperature in an air-conditioned room, and the bending strength was then measured using a multi-purpose strength tester. Bending strength retention ratio was evaluated as the ratio of the bending strength of the product obtained after the 1000-hour exposure to the bending strength of the bonded magnet before being introduced into the oven.

It is demonstrated that Examples 1 to 8 exhibited higher bending strength retention ratios than those of Comparative Examples 1 to 4, and therefore they had improved long-term heat resistance.

Evaluation of Unextractable Component

FIG. 1 shows the residue from Soxhlet extraction with hexafluoroisopropanol of the bonded magnet obtained in Example 1. The formation of a thin (about 100 μm) layer on the surface was observed. Further, Examples 2 to 8 and Comparative Examples 1 to 4 were subjected to soxhlet extraction in the same manner. An about 100 μm-thick surface layer was observed in Examples 2 to 8, while no surface layer was observed in Comparative Examples 1 to 4.

The magnetic powder-derived Fe concentration in the surface layer of the extraction residue of Example 1 was measured by X-ray fluorescence analysis (XRF), and the C (carbon) concentration thereof was measured by TOC analysis (combustion method). The results show that the Fe concentration was 72.1% by mass and the C concentration was 2.2% by mass. The central portion of the extraction residue was similarly subjected to Fe and C analyses. The results show that the Fe concentration was 72.1% by mass and the C concentration was 0.36% by mass. The proportion of the hexafluoroisopropanol-unextractable component in the extraction residue as defined by the equation: C/Fe×100 was 3.1% for the surface layer and 0.5% for the central portion. This demonstrated that the hexafluoroisopropanol-unextractable component was present in a larger amount in the surface layer. As demonstrated in Table 1, Examples 2 to 8 also exhibited the presence of a larger amount of the hexafluoroisopropanol-unextractable component in the surface layer.

The amount of the hexafluoroisopropanol-unextractable component of the Examples and Comparative Examples was calculated by subtracting the amount of the magnetic powder component from the mass of the extraction residue to calculate the mass of the hexafluoroisopropanol-unextractable component, and dividing the mass of the hexafluoroisopropanol-unextractable component by the mass of the bonded magnet measured before the Soxhlet extraction. The amount of the magnetic powder component was calculated from the amount of the magnetic powder-derived metal component determined by ICP-AES analysis of a fully dissolved solution of the extraction residue.

TABLE 1

|  | Magnetic powder 1 | Magnetic powder 2 | Heat treatment temperature ° C. | Heat treatment time hr | unextractable component mass % | C/Fe in Surface layer | C/Fe in Central portion | HDT ° C. | Bending strength retention ratio % |
| --- | --- | --- | --- | --- | --- | --- | --- | --- | --- |
| Example 1 | SmFeN | — | 150 | 1 | 0.4 | 3.1 | 0.5 | 151 | 125 |
| Example 2 | SmFeN | — | 150 | 5 | 0.5 | 3.9 | 0.5 | 162 | 104 |
| Example 3 | SmFeN | — | 150 | 24 | 0.6 | 4.6 | 0.5 | 166 | 99 |
| Example 4 | SmFeN | — | 150 | 50 | 0.9 | 6.1 | 0.5 | 172 | 97 |
| Example 5 | SmFeN | NdFeB | 150 | 5 | 0.2 | 0.9 | 0.4 | 151 | 96 |
| Example 6 | SmFeN | NdFeB | 150 | 5 | 0.3 | 2.0 | 0.3 | 155 | 97 |
| Example 7 | SmFeN | Ferrite | 150 | 5 | 0.2 | 1.8 | 0.5 | 147 | 99 |
| Example 8 | SmFeN | Ferrite | 150 | 5 | 0.4 | 2.6 | 0.3 | 158 | 102 |
| Comparative Example 1 | SmFeN | — | — | — | 0 | — | — | 138 | 83 |
| Comparative Example 2 | NdFeB | — | 150 | 5 | 0.1 | — | — | 141 | 74 |
| Comparative Example 3 | Ferrite | — | 150 | 5 | 0.1 | — | — | 135 | 84 |
| Comparative Example 4 | — | — | 150 | 5 | 0 | — | — | 60 | 74 |

The bonded magnet of the present invention has high heat resistance and is thus suitable for use in applications such as motors.

What is claimed is:

1. A bonded magnet, comprising:
   a SmFeN magnetic powder;
   nylon 12; and
   a surface layer including a hexafluoroisopropanol-unextractable component and having a thickness of 100 μm or greater and 1 mm or less in a depth direction from a surface of the bonded magnet,
   wherein a proportion of the hexafluoroisopropanol-unextractable component in the surface layer of an extraction residue from 24-hour Soxhlet extraction with hexafluoroisopropanol of the bonded magnet is greater than 0.9 and 6.1 or less,
   the proportion of the hexafluoroisopropanol-unextractable component is defined by an equation: C/Fe×100,
   wherein the C is C concentration by mass, and
   the Fe is Fe concentration by mass.

2. The bonded magnet according to claim 1,
   wherein the bonded magnet comprises the hexafluoroisopropanol-unextractable component in an amount of greater than 0.1% by mass and 5% by mass or less.

3. The bonded magnet according to claim 1,
   wherein the hexafluoroisopropanol-unextractable component is present in a larger amount in the surface layer than in a central portion of the bonded magnet.

* * * * *